United States Patent Office 3,494,304
Patented Feb. 10, 1970

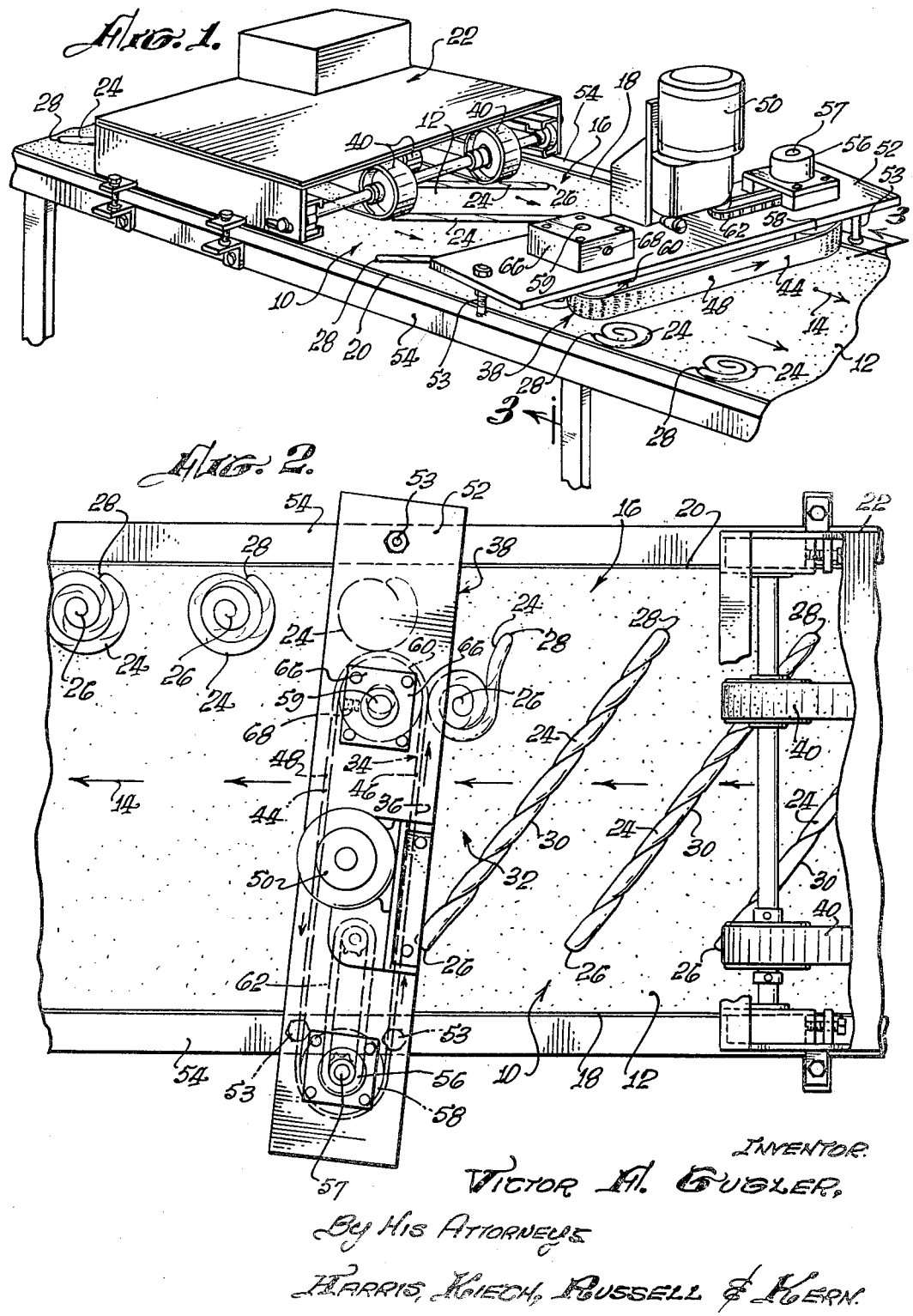

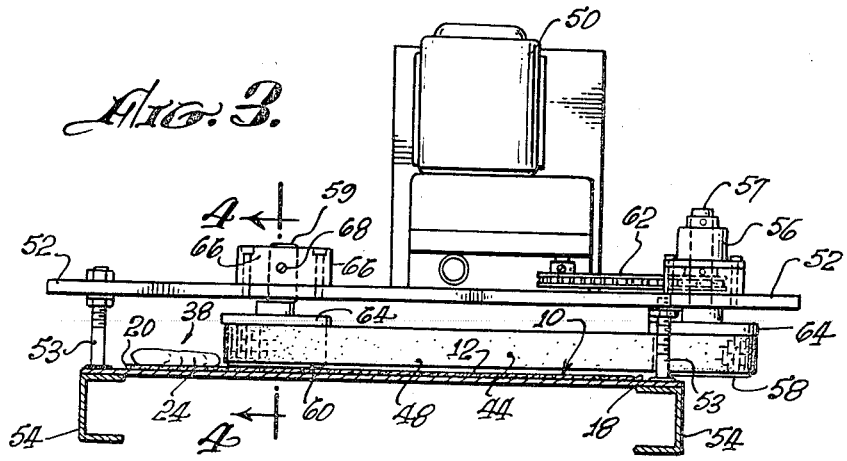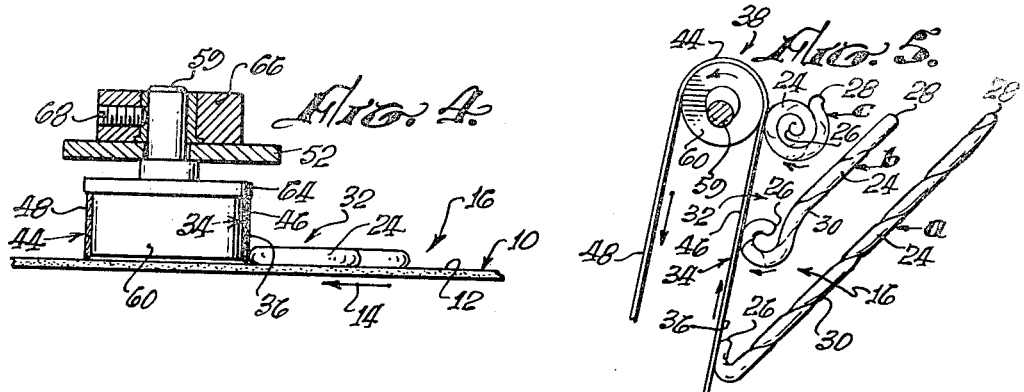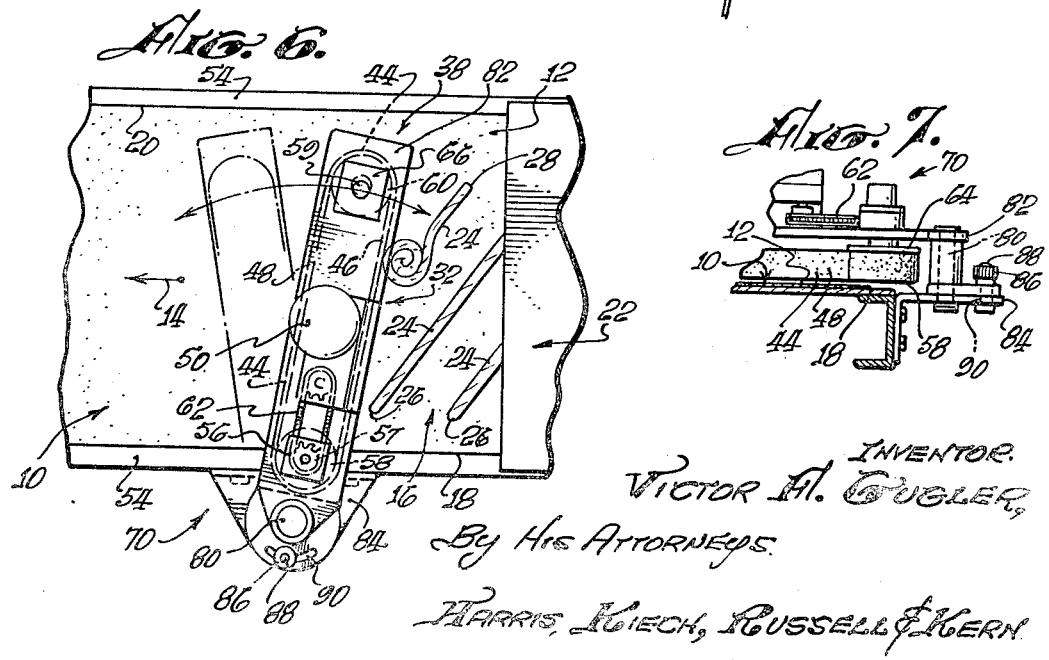

3,494,304
DOUGH-SHAPING MACHINE AND METHOD
Victor F. Gugler, 8920 Helen Ave.,
Sun Valley, Calif. 91352
Filed Feb. 14, 1968, Ser. No. 705,529
Int. Cl. A21c 3/06
U.S. Cl. 107—9
17 Claims

ABSTRACT OF THE DISCLOSURE

Method and apparatus for shaping dough into spirals in which a succession of dough lengths is placed in spaced relation on a dough-support surface moving forwardly toward a transverse rough-surface dough-forming belt. The dough-forming belt engages the leading end and a side of each dough length to shape it and displace it laterally.

---

The subject invention relates generally to dough-shaping apparatus and more particularly to a method and apparatus for sequentially shaping a succession of dough lengths.

The preparation of specialty items by a commercial bakery is presently a very laborious task which is done for the most part by hand. This is especially true when the baker desires to make a jelly roll, coffee roll, sweet bun, cinnamon roll, or the like wherein a piece of dough is shaped into various configurations before being baked. One of the reasons that such dough-shaping must be done by hand is the commercial necessity of maintaining the proper texture of the dough. Consumers are not interested in purchasing and eating baked goods which have lost their optimum texture because of rough handling or other improper care of the dough prior to baking. Another reason is that dough is inherently sticky, flabby, and elastic and therefore does not lend itself to control by the usual mechanical devices which have been developed in other industrial and manufacturing fields. Commercial bakeries have as a result been limited in the quality and quantity of their production by the ability and speed of each individual bakery worker as he manually twists, turns, and shapes each individual dough piece into a commerically desirable configuration such as a spiral or the like.

My prior Patent No. 3,038,418 is related to the present subject matter since it discloses a machine that satisfactorily twists successive lengths of dough and thereby avoids the above-mentioned drawbacks insofar as dough-twisting is concerned. However, it does not attempt to solve any of the problems which relate to the shaping of dough lengths into a configuration such as a spiral.

Accordingly, it is a general object of the present invention to overcome the foregoing quantitative and qualitative restrictions on dough-shaping by providing a method and apparatus for shaping dough pieces into commercially desirable configurations prior to baking, while at the same time maintaining optimum standards of texture, elasticity, and the like.

A more specific object is to provide a method and apparatus for shaping dough lengths without having to manually contact the dough itself. A related object is to provide apparatus which will satisfactorily replace the bakery workers who presently shape dough by hand.

Another object is to provide apparatus of the foregoing character which is strong, durable, and inexpensive, and which can be easily installed and operated in any commercial bakery presently in business.

Still another object is to provide apparatus of the foregoing character which will rapidly shape into substantially circular spirals a succession of dough lengths without any interfering contact taking place between adjacent dough lengths. A related object is to provide a dough-discharge area wherein the spiraled dough lengths are deposited in spaced relation and are transported forwardly without interfering contact between adjacent dough spirals.

A further object is to provide a dough-shaping apparatus adaptable for use with the dough-twisting machine of the kind disclosed in my prior Patent No. 3,038,418 whereby a succession of twisted dough lengths is placed in spaced relation on a dough-support surface of a conveyor and shaped into circular spirals.

Yet another object is to provide apparatus of the foregoing character which is adaptable for use with different sized dough lengths, with slow or fast-moving conveyors, and with successions of dough lengths having different angular attitudes with respect to the direction of movement of the conveyor.

A still more specific object is to provide apparatus of the foregoing character which includes a rough-surface dough-shaping belt or moving wall mounted in the path of advancement of the succession of dough lengths for sequentially engaging each dough length to shape it into a substantially circular spiral.

Further objects and advantages of the invention will be evident to those skilled in the art from the following description of a preferred embodiment.

In the drawings:

FIG. 1 is an isometric projection of the apparatus for shaping dough;

FIG. 2 is a top plan view;

FIG. 3 is an end view taken along line 3—3 in FIG. 1;

FIG. 4 is a sectional view taken along line 4—4 in FIG. 3;

FIG. 5 is a diagrammatic top view showing various stages in the shaping of a dough length into a spiral;

FIG. 6 is a top plan view showing an alternative embodiment; and

FIG. 7 is a side sectional view of the alternate embodiment of FIG. 6.

Generally speaking the apparatus includes a conveyor 10 having a dough-support surface 12 which moves in a forward direction 14 through a dough-transport zone 16 that is defined for reference purposes by a first side boundary 18 of the conveyor or zone and a second side boundary 20 thereof, both boundaries being parallel to the forward direction 14 of motion of the conveyor 10. Dough-positioning means 22 is provided for placing at least one dough length 24 on the dough-support surface 12 in order to advance it through the dough-transport zone 16 with its leading end 26 at least as close as its rearward end 28 to the first side boundary 18 and with one side 30 of the dough length at least partially facing the first side boundary 18.

The forwardly moving dough-support surface 12 transports the dough lengths 24 to a dough-shaping zone 32 wherein a wall 34 having a dough-engaging surface 36 extends above and closely adjacent to the dough-support surface. As the dough length 24 enters the dough-shaping zone 32 its leading end 26 contacts the dough-engaging surface 36. Means is provided for moving the wall 34 laterally of the forward direction 14 away from the first side boundary 18 and toward the second side boundary 20, movement of the wall displacing laterally the leading end 26 of the dough length 24 (position *a* of FIG. 5). As the end 26 is displaced laterally, the forward movement of the conveyor 10 brings the side 30 of the dough length 24 into engagement with the dough-engaging surface 36 with resultant lateral displacement of the end and side of the dough length (position *b* of FIG. 5). Further lateral movement of the wall 34 and advancing of the conveyor 10 shape the dough length 24 into a substantially spiral configuration (position c of FIG. 5).

In order to facilitate disposition of the spiraled dough lengths, the wall 34 terminates short of the second side boundary 20 toward which the wall is moving (see FIG. 3) thereby providing a dough-discharge area 38 at one side of the support surface 12. The moving wall 34 transfers the spiraled dough lengths from the dough-shaping zone 32 to the dough-discharge area 38 to be carried away by the forwardly moving support surface 12 to a discharge position.

Since it is commerically desirable to provide dough-forming apparatus which rapidly produces large quantities of spiraled dough lengths, the dough-positioning means 22 in the preferred embodiment (see FIGS. 1 and 2) includes means for placing a succession of substantially parallel dough lengths in spaced relation to each other on the dough-support surface 12.

As exemplified, the dough-positioning means 22 is the dough-twisting apparatus of my prior patent, supra, in which each dough length 24 will be twisted by the action of belts 40 that move relative to each other and relative to the support surface of the conveyor to twist lengths of dough entering the twisting apparatus, all as more fully described in my earlier patent. Using such twisting apparatus, each twisted dough length will be disposed obliquely on the support surface 12 at an angle relative to the forward direction 14 usually with portions of dough lengths overlapping but being spaced from succeeding and preceding dough lengths. However, various other dough-positioning means can be employed for placing elongated dough lengths on the support surface 12 whether angled as aforesaid or arranged in offset or in in-line relation with each other and with the side boundaries 18 and 20. In any of these instances the leading end 26 of each dough length is at least as close as its rearward end 28 to the first side boundary 18 and its side 30 will at least partially face such boundary. It will thus be apparent that the dough lengths 22 positioned on the support surface 12 may each be straight, slightly curved, or twisted, the latter being of particular value in the producing of certain spiraled bakery products. For example, straight, slightly curved, or twisted dough lengths can be used in the production of cinnamon rolls and the like.

In the preferred practice of the invention the dough-positioning means 22 will dispose a succession of dough lengths in spaced relation on the dough-support surface 12 in such pattern that each of the dough lengths is in an oblique position relative to the forward direction 14 of movement of the support surface 12 with its leading end 26 closer than its rearward end 28 to the first side boundary 18 and with its side 30 partially facing the latter. It is a feature of the invention that the same conveyor 10 and support surface 12 can be used for the dough-twisting or dough-positioning apparatus and the dough-spiraling apparatus thereby resulting in the efficient formation of dough lengths into substantially circular spirals.

The wall 34 which is mounted in the dough-shaping zone 32 may take various forms, but in the exemplary form it is formed by a narrow endless shaping belt 44 having a forward run 46 which faces the advancing dough lengths and provides the dough-engaging surface 36, the belt having also a return run 48. The forward run 46 is advanced away from the first side boundary 18 and toward the second side boundary 20 by drive means including a variable speed electric motor 50. In this regard a frame or plate 52 is provided above the support surface 12 with its ends supported by height-adjusting mounts 53 attached to side rails 54 on opposite sides of the support surface. Attached to the frame 52 in the vicinity of the first side boundary 18 is a bearing 56 journalling a drive shaft 57 on which a drive pulley 58 is mounted to turn about an axis perpendicular to the support surface 12. At a position closer to the second side boundary 20 an offset bottom portion of a bearing rod 59 journals an idler pulley 60 which likewise turns about an axis perpendicular to the support surface 12 but which is laterally adjustable as will be described. It is preferable that the idler pulley 60 be spaced an appreciable distance from the second side boundary 20 to provide the dough-discharge area 38 as previously mentioned. The shaping belt 44 encircles the drive and idler pulleys 58, 60, power being transferred from the motor 50 to the drive pulley by a drive chain 62 coupled with the drive shaft 57.

An optimum operating distance between the shaping belt 44 and the support surface 12 is maintained in the preferred form of the apparatus by using pulleys 58, 60 that are slightly crowned and each having a flange 64 at the top. The lower edge of the belt 44 should be only a small fraction of an inch above the support surface 12 and adjustment of this spacing is provided by the mounts 53.

Precise adjustments of the direction of movement and the tension of the shaping belt 44 are accomplished by adjustably mounting the top of the offset bearing rod 59 as best shown in FIGS. 3 and 4. In this connection the top of this bearing rod may extend into a passage of a block 66 mounted on the frame or plate 52, being held therein by a set screw 68. By loosening this set screw 68 the bearing rod 59 can be turned and the offset bottom portion thereof will move eccentrically to change the position of the idler pulley 60 and thus adjust the belt tension and to some degree the direction of movement of its forward run 46. Tightening of the set screw 68 prevents further rotation of the bearing rod 59 once the desired tension and direction have been attained.

As the succession of dough lengths 24 is carried forwardly on the support surface 12 by the conveyor 10 into the dough-shaping zone 32, the leading end 26 of each of the dough lengths is engaged by the dough-engaging surface 36 which in the preferred form is roughened to assure proper engagement. Upon such engagement, the lateral movement of the forward run 46 displaces the leading end 26 toward the second side boundary 20 and subsequently also displaces the side 30 of each dough length toward this boundary as the side is engaged by the rough surface of the shaping belt 44. Such engagement and displacement sequentially form each of the dough lengths 24 into a substantially spiral configuration as a result of the combined movement of the support surface 12 and the transverse wall formed by the forward run 46 of the belt 44. The forward run 46 also transfers the spiraled dough lengths to the dough-discharge area 38, from which they are carried forwardly in spaced relation on the support surface 12. It is preferable to have the shaping and lateral displacement of each dough length commence before the leading end of the succeeding dough length engages the rough surface, thereby avoiding interfering contact between adjacent dough lengths during the shaping operation. This can be accomplished by proper adjustment of the rates of movement of the forward run 46 and the support surface 12.

In order to assure that the lateral displacement of the leading end 26 and the side 30 of each of the dough lengths 24 results in the formation of a generally circular dough spiral and to assure that no interfering contact takes place between adjacent dough lengths throughout the shaping operation, it is often desirable to be able to adjust the angular position of the shaping belt 44 relative to the direction of movement 14 of the support surface 12. This and other desirable actions can be effected by use of the alternate embodiment of FIGS. 6 and 7. This embodiment includes means for coordinating the spaced relationship of the succession of dough lengths 24, their angular attitude relative to the dough direction 14 of movement of the conveyor 10, the speed of lateral movement of the forward run 46, and the speed of forward movement of the conveyor 10. Although various coordinating means might be employed, satisfactory results are obtained by providing means for changing the speed and means 70 for changing the direction of the lateral movement of the forward run 46 of the shaping belt 44. The speed-varying means may be the adjustable-speed motor 50 or any other means for changing the speed of the belt 44 independent of the speed of the conveyor. Through proper adjustment of the speed-varying means and the direction-varying means 70, it is also possible to vary the proximity or tightness of the turns of the resulting spiraled dough lengths.

In the preferred form of direction-varying means 70, a vertical pivoting pin 80 is used to attach one end of a modified frame 82 to a side rail mounting plate 84 attached to the side rail 54 in the vicinity of the first side boundary 18. The other end of the frame 82 is free to swing about the vertical axis defined by the pin 80. When the forward run 46 is in the desired position relative to the forward direction 14 of motion of the conveyor 10, the frame 82 is locked in position against the side rail mounting plate 84 by tightening a nut 86 on a plate bolt 88 which passes through an arcuate slot 90 in the plate 84. The long curved shape of the slot 90 allows free swinging movement of the frame 82 upon loosening the nut 86.

It will be appreciated that use of the coordinating means makes the dough-shaping apparatus adaptable for shaping dough lengths into desired spiral configurations without severe limitation as to the angular attitude of the dough lengths, their spacings, their length and breadth, and the forward speed of movement of the support surface on which they are placed.

It will be apparent to those skilled in the art that the present invention is not limited to producing circular dough spirals, but that proper adjustment of the spacing, angular disposition, and forward speed of movement of the succession of dough lengths combined with corresponding adjustment of the direction and speed of lateral movement of the shaping belt will result in various configurations of shaped dough lengths being produced. Furthermore, the desirable texture of the dough itself is maintained throughout each of the steps in the described dough-shaping method, irrespective of the configuration of the shaped dough lengths.

I claim as my invention:

1. Apparatus for shaping a dough length comprising:
   a conveyor having a dough-support surface moving in a forward direction and through a dough-transport zone defined by a first side boundary and a second side boundary, both of which are parallel to said forward direction;
   dough-positioning means for placing a dough length on said dough-support surface with its leading end at least as close as its rearward end to said first side boundary and having a side at least partially facing said first side boundary, said dough length being carried in said forward direction by said dough-support surface toward a dough-shaping zone;
   a wall in said dough-shaping zone extending above said support surface closely adjacent thereto in the path of advancement of said dough length, said wall including dough-engaging means for engaging said leading end of said dough length as it is advanced by said conveyor in said forward direction; and
   means for moving said wall laterally of said forward direction away from said first side boundary and toward said second side boundary during continued movement of said support surface to displace laterally said leading end of said dough length as it is engaged by said dough-engaging means thereby changing the shape of said dough length.

2. Apparatus as defined in claim 1 wherein said wall terminates short of said second side boundary toward which said wall moves to provide a dough-discharge area on said support surface, said wall transferring the shaped dough length from said dough-shaping zone to said dough-discharge area, whereby said shaped dough length is carried forwardly by said support surface away from said dough-discharge area.

3. Apparatus as defined in claim 2 wherein said dough-positioning means includes means for placing a succession of substantally parallel dough lengths in spaced relation to each other on said support surface, each dough length having its leading end at least as close as its rearward end to said first side boundary and a side at least partially facing said first side boundary, said dough lengths being carried in such spaced relation in said forward drection by said support surface toward said dough-shaping zone to be shaped and displaced toward said dough-discharge area, the rates of movement of said wall and said support surface being such as to start the shaping of each dough length and the lateral displacement thereof toward said dough-discharge area before the leading end of a succeeding dough length engages said wall.

4. Apparatus as defined in calim 3 including means for coordinating the spaced relationship of said succession of dough lengths, the angular attitude of said succession of dough lengths relative to said forward direction, the speed of lateral movement of said wall, and the forward speed of movement of said conveyor to shape said dough lengths into a substantially spiral configuration and to discharge the spiraled dough lengths into said dough-discharge area in spaced-apart relation whereby the spiraled dough lengths are carried forwardly by said support surface in spaced relation.

5. Apparatus as defined in claim 1 in which said wall is the forward run of an endless belt having a lower edge moving close to but slightly above said support surface.

6. Apparatus for shaping dough lengths into spiral form comprising:
   a conveyor having a dough-support surface moving in a forward direction toward a dough-shaping zone above said dough-support surface;
   dough-positioning means for placing a dough length on said dough-support surface in an oblique position relative to said forward direction, said dough length being carried in said forward direction by said dough-support surface toward said dough-shaping zone;
   an endless dough-shaping belt having forward ard return runs with said forward run including dough-engaging means for engaging said leading end and said side of said dough length as the dough length is advanced by said conveyor in said forward direction;
   means for mounting said shaping belt in the path of advancement of said dough length with said forward run in said dough-shaping zone, said forward run facing said dough length and being generally transverse to said forward direction; and
   drive means for moving said forward run of said shaping belt in a direction to displace laterally the engaged leading end of said dough length and shape said dough length into a generally circular dough spiral.

7. Apparatus as defined in claim 6 wherein said shaping belt encircles pulleys, one of which is a part of said drive means, that pulley toward which said forward run moves being spaced from one side of said conveyor to form a dough-discharge area on said dough-support surface, said forward run transferring said dough spiral from said dough-shaping zone to said dough-discharge area, whereby said dough spiral is carried forwardly by said dough-support surface away from said dough-discharge area.

8. Apparatus as defined in claim 7 wherein said dough-support surface moves through a dough-transport zone defined by a first side boundary and a second side boundary, both of which are parallel to said forward direction, and said dough-positioning means includes means or placing a succession of substantially parallel dough lengths in spaced relation to each other on said dough-support surface, each dough length having its leading end closer than its rearward end to said first side boundary and a side partially facing said first side boundary, said dough lengths being carried in said forward direction by said dough-support surface toward said dough-shaping zone to be shaped sequentially into generally circular dough spirals that are displaced laterally and successively into said dough-discharge area.

9. Apparatus as defined in claim 8 including means for coordinating the spaced relationship of said dough lengths, the angular attitude of said dough lengths relative to said forward direction, the speed of lateral movement of said forward run of said shaping belt, and the speed of forward movement of said conveyor to displace laterally said leading end and said side of each dough length as they are engaged by said dough-engaging means before the leading end of a succeeding dough length engages said forward run.

10. Apparatus as defined in claim 6 including:
means for changing the direction of lateral movement of said forward run of said shaping belt relative to said forward direction of motion of said conveyor; and
means for varying the speed of lateral movement of said forward run of said shaping belt relative to the speed of forward movement of said conveyor.

11. Apparatus as defined in claim 6 including means for varying the proximity of adjacent turns of said dough spirals, said last-named means including means for changing the direction of lateral movement of said forward run of said shaping belt relative to said forward direction of motion of said conveyor.

12. Apparatus as defined in claim 11 wherein said proximity varying means includes means for varying the speed of lateral movement of said forward run of said shaping belt relative to the speed of forward movement of said conveyor.

13. Apparatus for shaping dough comprising:
a conveyor having a dough-support surface moving in a forward direction toward a dough-shaping zone above said dough-support surface;
dough-positioning means for placing a succession of dough lengths on said dough-support surface of said conveyor in spaced relation with each dough length having a leading end and being carried in said forward direction by said dough-support surface toward said dough-shaping zone;
a frame above said support surface;
a drive shaft having a drive pulley mounted thereon, said drive shaft being journalled in a bearing attached to said frame to turn about an axis perpendicular to said dough-support surface of said conveyor;
an idler pulley journalled on a bearing rod attached to said frame, said idler pulley turning about another axis perpendicular to said dough-support surface of said conveyor;
a rough-surfaced dough-shaping belt encircling said drive and idler pulleys having a forward run closely adjacent said dough-support surface in said dough-shaping zone, said forward run facing said dough lengths and extending laterally of said forward direction for engaging the leading end and a side of each of said dough lengths as it is advanced by said conveyor in said forward direction; and
motor means for turning said drive shaft to move said forward run laterally of said forward direction to displace laterally said leading end and said side of each dough length as said leading end and said side are engaged by said forward run of said rough-surfaced dough-shaping belt thereby changing the shapes of said dough lengths.

14. Apparatus as defined in claim 13 wherein said pulleys are crowned pulleys having flanges at the top to maintain an optimum operating distance between said forward run of said rough-surfaced dough-shaping belt and said dough-support surface.

15. Apparatus adapted to spiral each of a succession of dough lengths positioned on a conveyor having a dough-support surface moving in a forward direction including:
a narrow endless rough-surfaced dough-shaping belt having forward and return runs;
means for mounting said rough-surfaced dough-shaping belt in the path of advancement of said dough lengths with said forward run closely adjacent said dough-support surface and extending laterally of said forward direction of motion thereof, said forward run facing said dough lengths to successively engage the leading ends thereof as said dough lengths are advanced by said conveyor in said forward direction; and
means for spiraling each dough length after its leading end has been engaged by said forward run, said last-named means including means for moving said forward run laterally of said forward direction of motion of said conveyor to displace laterally the engaged end of each dough length and to engage and displace laterally a side of the dough length as it is carried by said dough-support surface in said forward direction thereby sequentially shaping said dough lengths into generally circular dough spirals.

16. Apparatus as defined in claim 15 including:
means for changing the direction of lateral movement of said forward run of said shaping belt relative to said forward direction of motion of said conveyor; and
means for varying the speed of lateral movement of said forward run of said shaping belt relative to the speed of forward movement of said conveyor.

17. A method of spiraling elongated dough lengths by use of a moving wall, which method includes the steps of:
placing the elongated dough lengths on a support surface in a pattern;
moving the support surface toward said wall in such direction that each dough length approaches said wall at an acute angle so that the leading edge of each dough length engages said wall before the rearward edge of the dough length moves into the vicinity of said wall;
moving said wall in a direction generally transverse to the movement of said support surface and in a direction generally away from the apex of such acute angle and thus away from the point of engagement of the leading edge with the wall; and
controlling the rates of movement of said wall and said support surface to shape each dough length into a spiral configuration during the time it is supported on the moving support surface and as a result of engagement of said dough length and its leading edge with said moving wall, the rates of movement being controlled to displace each spiraled dough length away from the point at which the leading end of a succeeding dough length will engage said wall before the latter engagement takes place.

References Cited

UNITED STATES PATENTS

| | | |
|---|---|---|
| 1,167,187 | 1/1916 | Lauterbur. |
| 2,674,209 | 4/1954 | Anetsberger et al. |
| 3,121,406 | 2/1964 | Kieffaber. |

WALTER A. SCHEEL, Primary Examiner

ROBERT I. SMITH, Assistant Examiner

U.S. Cl. X.R.

107—54